Dec. 6, 1938.  A. E. RINEER  2,139,421
DRILL CHUCK
Filed Sept. 15, 1937

INVENTOR.
Arthur E. Rineer
BY Henry G. Dybvig
ATTORNEY.

Patented Dec. 6, 1938

2,139,421

UNITED STATES PATENT OFFICE 2,139,421

DRILL CHUCK

Arthur E. Rineer, Dayton, Ohio

Application September 15, 1937, Serial No. 163,992

1 Claim. (Cl. 279—62)

This invention relates to a chuck for a drill press and more particularly to the key ring for tightening and loosening the gripper jaws.

A key ring for tightening and loosening the gripper jaws of a chuck having gear teeth along one side thereof to be actuated by a key having a small pinion meshing with the gear teeth is old, as shown in the patent to Jacobs No. 709,014 dated Sept. 16, 1902. There is a tendency, and a very marked tendency, for the key to slip outwardly out of engagement with the teeth and to become worn, due to the key coming partially out of its socket. As a result of this, the key ring must be replaced at frequent intervals. It has been proposed to use spiral teeth, or inclined teeth, so as to cause a coaction between the teeth on the key and the teeth on the key ring to cause the key to be drawn into the socket. This has been found to give excellent results when tightening the gripper jaws; but when it comes to loosening the gripper jaws the inclined teeth tend to pull the key outwardly, which completely defeats the purpose of the inclined teeth. With this arrangement it is very easy to tighten the gripper jaws; but exceedingly difficult to loosen them.

An object of this invention is to provide inclined gear teeth on opposite ends of the key ring, so that one set of gear teeth may be used when tightening the gripper jaws, the other set of gear teeth to be used when releasing the gripper jaws.

Another object of this invention is to provide an attachment for chucks now in use, so as to add a second set of gear teeth to be used when releasing the gripper jaws.

Other objects and advantages reside in the construction of parts, the combination thereof and the mode of operation as will become more apparent from the following description.

In the drawing, Fig. 1 shows a side view of a chuck.

Figure 1:
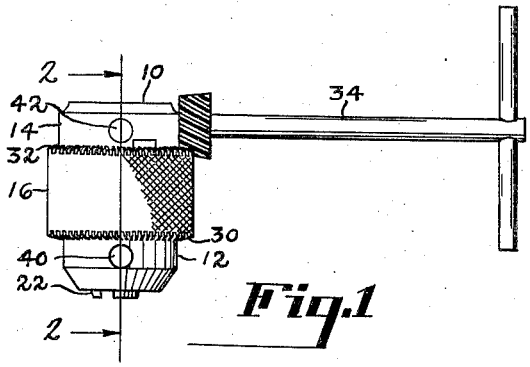
Figure 4:
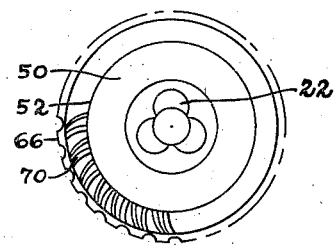
Fig. 4 shows an end view disclosing the inclined teeth.

The chuck disclosed herein utilizes a conventional chuck structure with the exception of the key ring which has been provided with two sets of inclined gear teeth, inclined in opposite directions, so that one set of gear teeth located on one side of the key ring may be utilized to tighten the gripper jaws and the other set of gear teeth disposed on the opposite side of the key ring may be used when releasing the gripper jaws.

The chuck body 10 is provided with a pair of cylindrical portions or extensions 12 and 14, one above and one below the cylindrical or tubular key ring 16. The body 10 has a plurality of diagonally disposed recesses 20, each supporting a gripper jaw 22, provided with inclined teeth 24, meshing with the threads 26 found on a collar or nut 28, suitably attached to the key ring 16. The mechanism described thus far is broadly old, excepting the shape of the body and the key ring.

The key ring 16 is provided with two sets of gear teeth, one indicated by reference character 30 and the other by reference character 32. These gear teeth are inclined, the gear teeth 30 being inclined in one direction and the gear teeth 32 being inclined in the opposite direction, when viewed from the same side.

The key ring 16 is rotated upon the body portion 10 either manually or by the key 34 having the end portion 38 seated in a selected socket, either 40 or 42. For most purposes the key 34 is absolutely essential to obtain a sufficient firm grip on the drill or whatever other tool is used. Let it be assumed that the gear teeth 30 are best suited to tighten the gripper jaws 22 and the gear teeth 32 adapted to best release the gripper jaws. By positioning the key in one of the sockets in the extension 12 the gripper jaws may be tightened very effectively by rotating the key 34 which drives the key ring 16 actuating the nut 28.

In loosening the gripper jaws, the key 34 is preferably inserted into the socket 42 in the cylindrical portion 14, so as to cause the key 34 to effectively engage the gear teeth 32 to loosen the gripper jaws. The reverse inclination of the gear teeth on opposite ends of the key ring permits the use of the same tool for effectively tightening the key ring when using one set of gear teeth and for loosening the key ring when using the other set of gear teeth. Thereby the gripper jaws may be either tightened or loosened with equal ease. The key 34 is rotated in the same direction both when tightening the gripper jaws and when releasing same.

Figure 2:
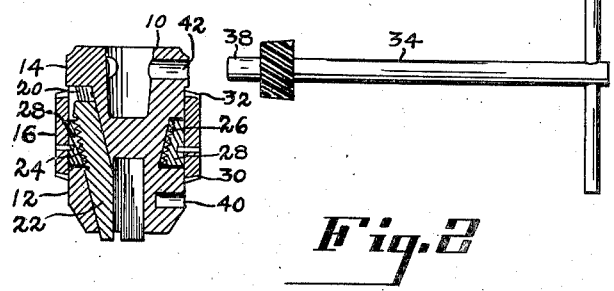
Fig. 2 is a cross sectional view taken substantially on the section line 2—2 of Fig. 1.
Figure 3:
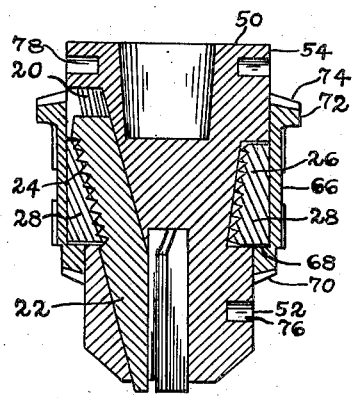
Fig. 3 shows a sectional view of a modification.

In the modification disclosed in Fig. 3, the body portion 50 is provided with cylindrical portions 52 and 54 extending beyond the key ring 66. The diameter of the cylindrical portion 52 adjacent the gripper jaws is less than the diameter of the cylindrical portion 54. As the working parts of the chuck shown in Fig. 3 are much the same as those shown in Figs. 1 and 2, these parts will not be described in detail. The key ring 66 is provided with a shoulder 68 which necessitates inserting the key ring upon the body from the gripper jaw end thereof. This gives rise to the necessity for using cylindrical portions 52 and 54 of different diameters.

The gear teeth 70 found on the lower end of the key ring 66, as shown in Fig. 3, are inclined in one direction, much the same as the inclination of the gear teeth described in connection with the embodiment shown in Figs. 1 and 2. The upper end of the key ring 66 is provided with a shoulder or enlargement 72, which forms the support for the gear teeth 74. In this modification, due to the greater diameter of the key ring at the upper end, as compared to the lower end, it is necessary to have a greater number of gear teeth on the upper end than on the lower end. The key ring 66 may be tightened by inserting the end 38 of the key 34 into the socket 76. This key ring may easily be loosened by inserting the end 38 into the socket 78. Due to the inclination of the teeth the key will automatically properly seat itself and tend to work into the gear teeth.

Figure 6:
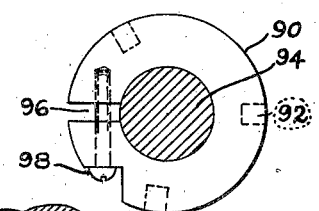
Fig. 6 is a cross sectional view taken on the line 6—6 of Fig. 5.
Figure 5:
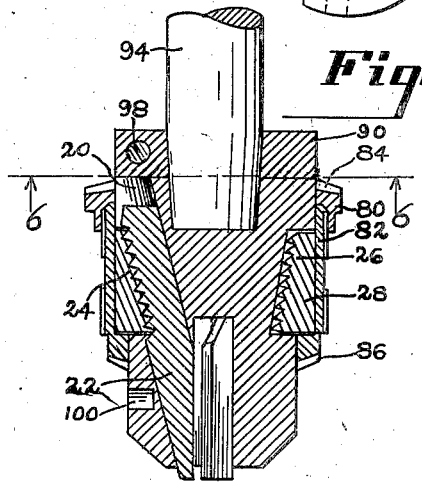
Fig. 5 shows a modification utilizing an attachment for conventional chucks now in use.

In the modification disclosed in Figs. 5 and 6 an attachment has been shown that may be used with chucks now appearing on the market and now in use, so as to convert the chucks into chucks having a double set of gear teeth. This attachment includes a gear ring 80 press fitted, welded or threadedly engaging the conventional key ring 82 on standard chucks. The teeth 84 on the gear ring 80 are inclined in a direction opposite to the inclination of the gear teeth 86 found on the conventional key ring 82. A collar 90 is attached to the arbor 94 of the drill press and provides suitable sockets 92, adapted to receive the end 38 of the key 34. The collar 90 is preferably split at 96 and tightened upon the arbor 94 by means of a suitable screw 98.

When tightening the key ring 82, so as to tighten the gripper jaws, the key 34 is preferably inserted into the socket 100 adapted for use with the gear teeth 86. Chucks now in use are provided with inclined gear teeth which are very effective in tightening the chuck; but very inefficient when it comes to loosening the chuck. The attachment including the gear ring 80 and the collar 90 expedites the release of the gripper jaws, in that the key 34 may then be used to loosen the key ring 82 and thereby release the gripper jaws.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claim.

Having thus described my invention, I claim:

In a drill press chuck adapted for use with a key having a pinion provided with inclined gear teeth, the combination including a body portion and a key ring portion, the body portion having key receiving sockets on both sides of the key ring, the opposite sides of said ring having inclined gear teeth, the gear teeth on one side being oppositely inclined with respect to the gear teeth on the other side so that the key when inserted in one of the sockets on one side of the key ring will effectively tighten the gripper jaws of the chuck and when inserted in the socket on the other side of the key ring will effectively loosen the key ring, thereby releasing the gripper jaws.

ARTHUR E. RINEER.